US012479496B2

(12) United States Patent
Fehlings et al.

(10) Patent No.: US 12,479,496 B2
(45) Date of Patent: Nov. 25, 2025

(54) METHOD FOR ADJUSTING A STEERING APPARATUS FOR A VEHICLE, AND STEERING APPARATUS FOR A VEHICLE

(71) Applicant: ZF Automotive Germany GmbH, Alfdorf (DE)

(72) Inventors: Dieter Fehlings, Kempen (DE); Juergen Floerchinger, Erkrath (DE); Maurice Mistler, Duisburg (DE); Dominik Lips, Osnabrück (DE)

(73) Assignee: ZF AUTOMOTIVE GERMANY GMBH, Alfdorf (DE)

( * ) Notice: Subject to any disclaimer, the term of this patent is extended or adjusted under 35 U.S.C. 154(b) by 132 days.

(21) Appl. No.: 18/333,807

(22) Filed: Jun. 13, 2023

(65) Prior Publication Data
US 2023/0399043 A1 Dec. 14, 2023

(30) Foreign Application Priority Data
Jun. 14, 2022 (DE) .......................... 102022206010.5

(51) Int. Cl.
*B62D 1/183* (2006.01)
(52) U.S. Cl.
CPC .................... *B62D 1/183* (2013.01)
(58) Field of Classification Search
CPC ................ B62D 1/183; B62D 3/181
See application file for complete search history.

(56) References Cited

U.S. PATENT DOCUMENTS

| 6,390,505 | B1 | 5/2002 | Wilson | |
| 2015/0025744 | A1* | 1/2015 | Banno | B62D 6/04 |
| | | | | 701/41 |
| 2016/0244070 | A1* | 8/2016 | Bendewald | B62D 1/04 |
| 2016/0375926 | A1* | 12/2016 | Lubischer | B62D 1/183 |
| | | | | 74/493 |
| 2016/0375927 | A1* | 12/2016 | Schulz | B60R 21/2338 |
| | | | | 280/775 |
| 2018/0273081 | A1* | 9/2018 | Lubischer | B62D 1/19 |
| 2021/0061208 | A1* | 3/2021 | Horvath | B60R 21/00 |
| 2021/0261186 | A1* | 8/2021 | Hikida | B62D 15/02 |
| 2022/0297539 | A1* | 9/2022 | Sasaki | B60K 26/021 |

FOREIGN PATENT DOCUMENTS

| DE | 102013216151 A1 | 6/2014 |
| FR | 3105149 A1 | 6/2021 |

* cited by examiner

*Primary Examiner* — Long T Tran
(74) *Attorney, Agent, or Firm* — Tarolli, Sundheim, Covell & Tummino LLP

(57) ABSTRACT

The disclosure relates to a method for adjusting a steering apparatus for a vehicle, in which a steering column is adjusted in the longitudinal direction of the steering column and/or in respect of an inclination of the steering column by an electromechanical adjustment device, and in which the adjustment device is controlled by a control device. In order to improve the operability of the electromechanical adjustment device for a user, the method comprises an adjustment force for adjusting the steering column being introduced into the steering apparatus via a steering wheel, wherein an adjustment signal which is dependent on the adjustment force is detected and/or generated, the adjustment signal being transmitted to the control device and the steering column being adjusted on the basis of the adjustment signal.

20 Claims, 3 Drawing Sheets

METHOD FOR ADJUSTING A STEERING APPARATUS FOR A VEHICLE, AND STEERING APPARATUS FOR A VEHICLE

CROSS-REFERENCE TO RELATED APPLICATION

This application claims priority to German Priority Application No. 102022206010.5, filed Jun. 14, 2022, the disclosure of which is incorporated herein by reference in its entirety.

TECHNICAL FIELD

The disclosure relates to a method for adjusting a steering apparatus for a vehicle, in which a steering column is adjusted in the longitudinal direction of the steering column and/or in respect of an inclination of the steering column by an electromechanical adjustment device, and in which the adjustment device is controlled by a control device. Furthermore, the disclosure relates to a steering apparatus for a vehicle, said steering apparatus comprising a steering column, a steering wheel connected to the steering column, and an electromechanical adjustment device, the steering column being adjustable in the longitudinal direction of the steering column and/or in respect of an inclination of the steering column by the adjustment device, and having a control device for controlling the adjustment device.

BACKGROUND

In respect of the operation by a user or a driver of a vehicle having such a steering apparatus, it is furthermore known that the user, for example, actuates a 4-way switch in order to adjust the steering column by the electromechanical adjustment device. Owing to a longitudinal displacement and/or a change in the inclination of the steering column, the position of the steering column, and therefore the position of the steering wheel, can be adapted to the individual requirement and the physiognomy of the user.

In addition to steering apparatuses having an electromechanical adjustment device for aligning the steering column, steering apparatuses may also include purely mechanical adjustment devices. In this case, after a clamping device is released, the steering column is positioned by way of shifting of the steering wheel and subsequently fixed again by actuation of the clamping device. In this case, the user pushes or pulls the steering wheel in the longitudinal direction of the steering column and/or upward or downward in order to adjust the steering column and therefore the steering wheel in the desired manner. This type of positioning is particularly intuitive for the user.

In the case of a conventional steering apparatus having an electromechanical adjustment device, such an intuitive operation has not been possible.

SUMMARY

The disclosure describes a method and/or a steering apparatus in such a manner that operation of the electromechanical adjustment device is improved.

The object on which the invention is based is achieved by a method as claimed in claim 1 and by a steering apparatus as claimed in claim 10. Preferred developments of the invention are found in the dependent claims and in the description below.

A method can include adjusting a steering apparatus for a vehicle, in particular a motor vehicle. The vehicle can include the steering apparatus. In this method, a steering column is adjusted in the longitudinal direction of the steering column and/or in respect of an inclination of the steering column by an electromechanical adjustment device. The adjustment device is controlled here by a control device.

An adjustment force for adjusting the steering column is introduced into the steering apparatus via a steering wheel. In the process, an adjustment signal which is dependent on the adjustment force is detected and/or generated, the adjustment signal being transmitted to the control device and the steering column being adjusted on the basis of the adjustment signal.

In this case, it is of advantage that an intuitive operation by the user or driver is therefore made possible in the case of a steering apparatus having an electromagnetic adjustment device. The user can introduce the adjustment force into the steering apparatus by pushing, pulling, lifting and/or lowering the steering wheel. Said introduced adjustment force causes the adjustment signal, on the basis of which, in turn, the electromechanical adjustment device is activated in order to adjust the steering column. Additional operating elements, for example a 4-way switch, for controlling and operating the electromechanical adjustment device can therefore be dispensed with.

In particular, a force action direction of the introduced adjustment force is detected and/or determined. The adjustment signal can contain information about the force action direction. The steering column can be adjusted in a direction in accordance with the force action direction by the electromechanical adjustment device.

According to an exemplary arrangement, the adjustment force and/or the adjustment signal is detected and/or generated by a sensor system. The sensor system can include at least one sensor element or a plurality of sensor elements or can have such a sensor element or a plurality of sensor elements. The at least one sensor element can be designed as a force sensor. The adjustment force which is introduced into the steering device can therefore be directly detected by a suitably designed sensor system. The sensor system can be used to detect the adjustment force which acts on the steering column and/or on the adjustment device and/or on the steering wheel and is introduced by a user or a driver. The sensor system and/or the at least one sensor element can be arranged on the steering wheel and/or on the steering column and/or on the adjustment device.

According to another exemplary arrangement, the adjustment signal is detected and/or generated via a detection and/or measurement of at least one status value of the adjustment device. The status value can be an electric current, an electric voltage, a torque, a drive position, an acceleration or an angular speed. An individual status value or a plurality of status values can be detected or measured. In particular, in this exemplary arrangement, an additional sensor system for directly detecting the adjustment force can be dispensed with. Instead, the detection and/or the measurement of the status value, for example the electric current of the adjustment device, can be indirectly used to draw a conclusion about the introduced adjustment force and to take it into consideration via the adjustment signal.

In an exemplary arrangement, the adjustment device has at least one electric drive, the status value, in particular the electric current, of the electric drive being detected and/or measured and/or evaluated by an evaluation device. The driving position as a status value can be determined by an angle of rotation of the drive. Alternatively or additionally, the driving acceleration and/or the driving angular speed can be detected or measured as a status value. The adjustment device can have a single electric drive for adjusting the steering column in the longitudinal direction of the steering column and in respect of the inclination of the steering column. In an exemplary arrangement, the adjustment device can have a first electric drive and a second electric drive. In this case, the first electric drive can be designed for adjusting the steering column in the longitudinal direction of the steering column and the second electric drive for adjusting the steering column in respect of its inclination. In this case, both the status value, in particular the electric current, of the first electric drive and of the second electric drive is detected and/or measured and/or evaluated by the evaluation device. Depending on the evaluation of the status value, such as the electric current, it can be determined whether an adjustment force for adjusting the steering column is introduced into the steering apparatus.

According to an exemplary arrangement, the adjustment device is blocked and/or secured in a starting mode to prevent an adjustment of the steering column. The adjustment device can be held in the starting mode or transferred depending on a status of the vehicle. If the vehicle is in motion, for example, provision can be made for the adjustment device to basically be in the starting mode. This prevents the position of the steering column from being able to change during a journey of the vehicle. In particular, the at least one electric drive of the adjustment device is currentless in the starting mode.

The adjustment device can be transferred from the starting mode into a standby mode by an activation signal. The activation signal can be triggered by the user and/or depending on a status of the vehicle having the steering apparatus according to the invention. For example, the activation signal can be generated by a mechanical switch, a spoken command, a gesture recognition, a touchscreen or a touch button. Provision can be made that the adjustment device can be transferred from the starting mode into the standby mode only if the vehicle is not in motion or is at a standstill.

In the standby mode, introduction of the adjustment force and/or generation of the adjustment signal can be monitored continuously. In particular, the adjustment device is transferred from the standby mode into a movement mode when an adjustment force is detected and/or an adjustment signal is detected. In this case, the steering column can be moved in the movement mode in accordance with the adjustment signal. In the movement mode, the steering column and therefore the steering wheel can be adjusted within a predetermined positioning space. Depending on a mode of the vehicle, positioning spaces of differing size can be predetermined. For example, for customary use by a user or a driver, it is possible to predetermine a positioning space which is smaller than a positioning space for the vehicle in a workshop mode.

According to an exemplary arrangement, in the standby mode, a status value, in particular an electric current, in at least one electric drive of the adjustment device is monitored in respect of a change. The adjustment device can be transferred from the standby mode into the movement mode if the detected status value, such as the electric current, of the at least one electric drive of the adjustment device deviates from a predetermined reference status value, such as an electric reference current value. In this case, the steering column is moved in the movement mode in accordance with the adjustment signal. In the movement mode, the steering column can be adjusted at a fixed, predetermined movement speed. In an exemplary arrangement, the movement speed of the steering column can be regulated depending on and/or in proportion to the introduced adjustment force. For example, a maximum movement speed is predetermined.

A sign of the change in the status value, for example, the electric current, can be positive or negative with regard to the predetermined reference status value, such as the electric reference current value. Depending on said sign, the steering column is moved in the movement mode in one of two opposite directions in the longitudinal direction of the steering column and/or in respect of the inclination of the steering column. Depending on whether the status value of the electric drive of the adjustment device is above or below the predetermined reference status value, a direction-dependent adjustment of the steering column can therefore be undertaken.

According to an exemplary arrangement, in the standby mode, the at least one electric drive of the adjustment device is operated with the predetermined reference status value, for example, the electric reference current value, or in a predetermined reference status range, such as an electric reference current range. In this exemplary arrangement, the steering column is moved in the standby mode in the longitudinal direction of the steering column and/or in respect of the inclination of the steering column. For example, the steering column is moved in the standby mode and without an adjustment force for adjusting the steering column via the steering wheel being introduced into the steering apparatus. Owing to the movement of the steering column in the standby mode and, for example, with the predetermined reference current value or in the predetermined reference current range, self-locking of the adjustment device can be released. The at least one electric drive of the adjustment device can have a self-locking spindle device. For example, if the at least one electric drive of the adjustment device is switched currentlessly, an adjustment of the steering column is locked because of the self-locking of the adjustment device or the self-locking of the electric drive. To release said self-locking, the steering column can be automatically set into motion after transfer of the adjustment device from the starting mode into the standby mode. The movement of the steering column in the standby mode can take place at a predetermined standby speed. For example, the standby speed in the standby mode is smaller than a movement speed of the steering column in the movement mode. The steering column can be set into a vibratory motion in the standby mode. Owing to the vibratory motion, the steering column can be moved forward and back and/or up and down in the longitudinal direction of the steering column and/or in respect of the inclination of the steering column.

According to another exemplary arrangement, the adjustment device changes from the movement mode into the standby mode if the previously detected adjustment force and/or a previously detected deviation in the status value, for example, the electric current, with regard to the reference status value, such as the electric reference current value, assumes the value zero. For example, the adjustment device is transferred from the standby mode into the starting mode if, for a predetermined period of time, no adjustment force, no adjustment signal and/or no deviation in the status value, in particular the electric current, with regard to the reference status value, such as the electric reference current value, is detected.

According to an exemplary arrangement, the adjustment device is transferred from the movement mode directly into the starting mode on the basis of a deactivation signal. The adjustment device can therefore be transferred from the movement mode to the starting mode with the standby mode being bypassed. For example, the deactivation signal is triggered by active handling or an active input by the user. For example, the deactivation signal can be generated by a mechanical switch, a spoken command, a gesture recognition, a touchscreen or a touch button.

The steering apparatus realizes anti-trapping protection in the movement mode and/or in the standby mode of the adjustment device. A risk of injury to the user can be reduced by the anti-trapping protection. For example, in order to realize the anti-trapping protection, a resistance during the moving or during the movement of the steering column is monitored. If the monitored resistance exceeds a predetermined maximum resistance value, the movement of the steering column is stopped or is moved for a predetermined distance in a direction opposite the original direction. In this configuration, for example, trapping of fingers of the user between the moving steering column and stationary dashboard components can be avoided. For example, in order to monitor the resistance, the electric current in the at least one electric drive is monitored. If the electric current rises above a predetermined maximum current value, the movement of the steering column is stopped or is moved for a predetermined distance in a direction opposite the original direction.

A steering apparatus for a vehicle includes a steering column, a steering wheel connected to the steering column, and an electromechanical adjustment device. With the scope of the present application, the term "steering wheel" is representative of any possible configuration and design of a steering handle for steering the vehicle, the steering handle being connected to the steering column. The steering column is adjustable in the longitudinal direction of the steering column and/or in respect of the inclination of the steering column by the adjustment device. Furthermore, the steering device has a control device for controlling the adjustment device. The vehicle, in particular a motor vehicle, has the steering apparatus according to the invention. The steering apparatus has a detection device for detecting an adjustment force introduced via the steering wheel. In this case, the steering column is adjustable by an adjustment signal which is transmitted from the detection device to the control device.

The detection device can have a sensor system for detecting the adjustment force, such as at least one sensor element or a plurality of sensor elements. For example, the detection device or the sensor system can have at least one force sensor. The sensor system or the at least one force sensor can be formed or arranged on the steering column and/or on the adjustment device and/or on the steering wheel. For example, the adjustment force can be directly detectable or measurable with a detection device designed in such a way.

According to another exemplary arrangement, the adjustment device and an evaluation device of the steering apparatus are designed as parts of the detection device. The detection device can therefore be formed by already existing parts of the steering apparatus. In particular, additional sensor elements and/or explicit force sensors can be dispensed with. The adjustment device has at least one electric drive, wherein at least one status value of the electric drive can be detected and/or can be measured and/or can be evaluated by the evaluation device. The status value of the electric drive can include an electric current, an electric voltage, a torque, a drive position, an acceleration or an angular speed. In an exemplary arrangement, the evaluation device and the control device form a single constructional unit. In another exemplary arrangement, the evaluation device and the control device can be designed as separate constructional units which are connected to one another.

The method according to the disclosure can be developed in accordance with the refinements explained in conjunction with the steering apparatus described here. Furthermore, the steering apparatus described here can be further developed in accordance with the refinements explained in conjunction with the method.

BRIEF DESCRIPTION OF DRAWINGS

The disclosure will be explained in more detail with reference to the figures. The same reference signs refer here to identical, similar or functionally identical components or elements. In the figures.

DETAILED DESCRIPTION

Figure 1:
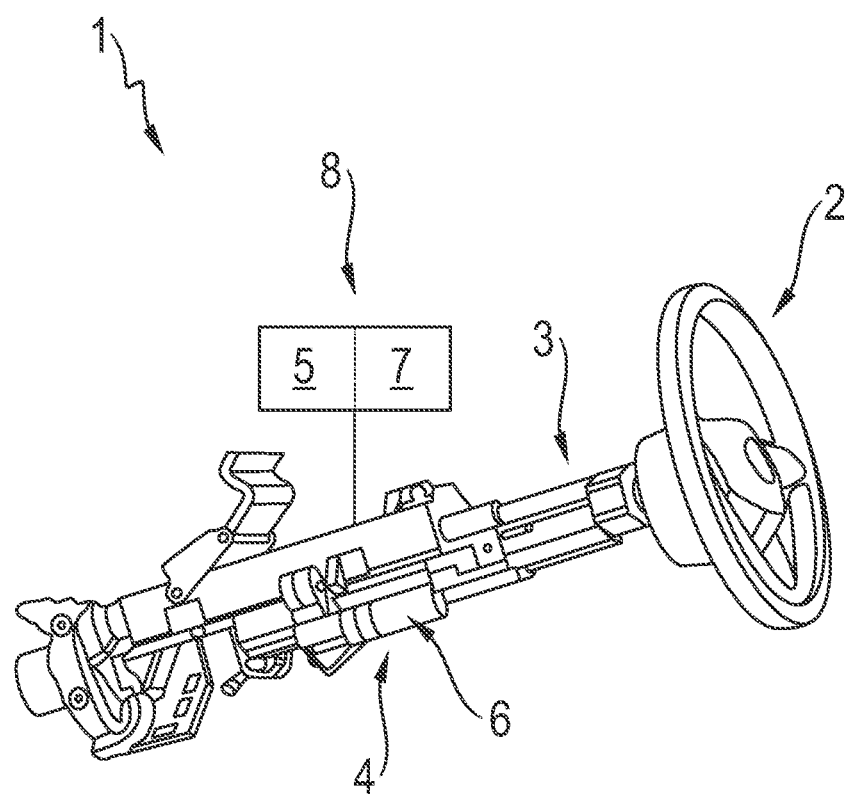
FIG. 1 shows a perspective side view of a steering apparatus according to the disclosure.

FIG. 1 shows a perspective side view of a steering apparatus 1 according to the disclosure. The steering apparatus 1 is designed for steering a vehicle, not illustrated specifically. For this purpose, the steering apparatus 1 has a steering wheel 2. The steering wheel 2 is connected to a steering column 3. According to this exemplary arrangement, the steering apparatus 1 is referred to as steer-by-wire steering.

Furthermore, the steering apparatus 1 has an electromechanical adjustment device 4. In this case, the steering column 3 is adjustable in the longitudinal direction of the steering column 3 and/or in respect of an inclination of the steering column 3 by the adjustment device 4. To control the adjustment device 4, the steering apparatus 1 has a control device 5, merely indicated schematically here.

In order to adjust the steering column 3, the adjustment device 4 has at least one electric drive 6. A status value of the electric drive 6 can be detected and can be evaluated by an evaluation device 7. In this exemplary arrangement, an electric current to the electric drive 6 is detected or measured and evaluated by the evaluation device 7. The evaluation device 7 of the steering apparatus 1 is likewise merely indicated schematically here. In this exemplary arrangement, the control device 5 and the evaluation device 7 are combined in one constructional unit.

A detection device 8 is designed for detecting an adjustment force, which is introduced by a user, not illustrated specifically here, via the steering wheel 2, in order to adjust the steering column 3. In this exemplary arrangement, the adjustment device 4 and the evaluation device 7 connected to the adjustment device 4 form parts of the detection device 8. An adjustment signal generated by the detection device 8 or here the evaluation device 7 is transmitted to the control device 5 in order to adjust the steering column 3.

Figure 2:
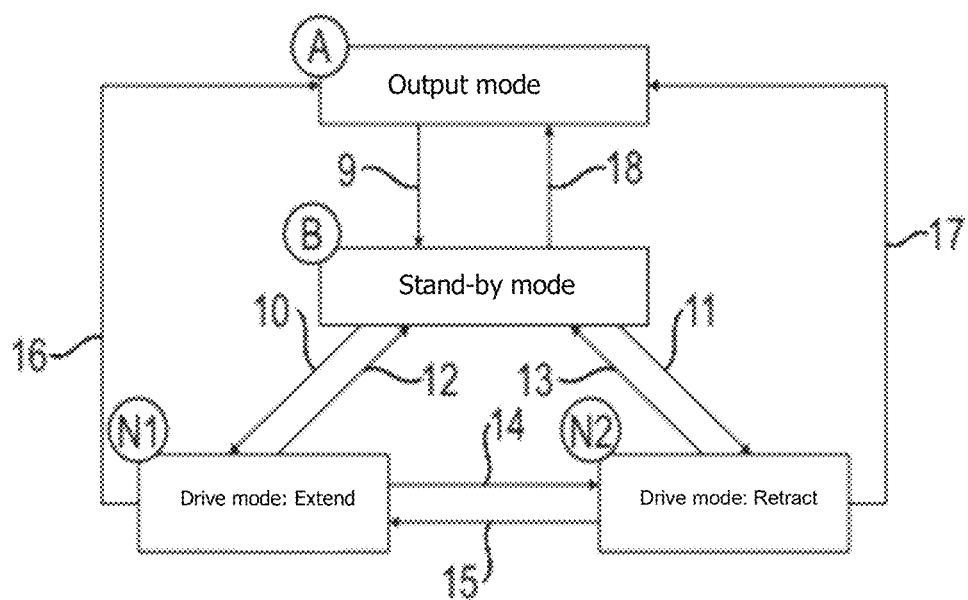
FIG. 2 shows a schematic first sequence diagram of a method according to the disclosure.

FIG. 2 shows a schematic first sequence diagram of a method according to the present disclosure. The method serves here by way of example for adjusting the steering apparatus 1 according to FIG. 1. To this extent, reference is also made to the preceding description for the explanations below.

According to the schematic sequence diagram illustrated here, there are different modes in which the steering apparatus 1 or the adjustment device 4 according to FIG. 1 can be operated. The adjustment device 4 is thus locked in a starting mode A in order to prevent adjustment of the steering column 3. In the exemplary arrangement according to FIG. 1, the at least one electric drive 6 of the adjustment device 4 is currentless in the starting mode A. The adjustment device 4 can be transferred from the starting mode A into a standby mode B by an activation signal. The activation signal is triggered here on the basis of an active action or an active input of a user or a driver of a vehicle having the steering apparatus 1. The transfer according to arrow 9 from the starting mode A into the standby mode B results on the basis of the activation signal.

In the standby mode B, an introduction of an adjustment force via the steering wheel 2 into the steering apparatus 1 or a generation of the adjustment signal is monitored continuously. If, in the standby mode B, an adjustment force introduced into the steering apparatus 1 via the steering wheel 2 or an adjustment signal caused by the adjustment force is detected, the adjustment device 4 is transferred from the standby mode B into a movement mode N1 or N2 in accordance with arrow 10 or 11.

If, according to this exemplary arrangement, pulling in the longitudinal direction of the steering column 3 is recognized, the adjustment device 4 is transferred in accordance with arrow 10 into the movement mode N1 in order to extend the steering column 3. In the movement mode N1, the electric drive 6 of the adjustment device 4 is therefore controlled in such a manner that the steering column 3 is extended. If, instead, starting from the standby mode B, pushing in the longitudinal direction of the steering column 3 is recognized, the adjustment device 4 according to arrow 11 transfers into the movement mode N2 in order to retract the steering column 3.

If, during the movement mode N1 or N2, no further adjustment requirement is recognized, the adjustment device 4 is moved back out of the movement mode N1 or N2 into the standby mode B in accordance with arrow 12 or 13.

If, during the movement mode N1 or N2, a respectively opposite adjustment requirement is detected, the adjustment device 4 changes directly from the movement mode N1 into the movement mode N2 in accordance with arrow 14 or from the movement mode N2 into the movement mode N1 in accordance with arrow 15.

In this exemplary arrangement, the adjustment device 4 can be transferred by a deactivation signal from the respective movement mode N1 or N2 in accordance with arrow 16 or 17 into the starting mode A with the standby mode B being bypassed. In this exemplary arrangement, the deactivation signal can be triggered by an active action or an active input by the user.

Starting from the standby mode B, the adjustment device 4 can be transferred into the starting mode A in accordance with arrow 18 if no adjustment force or no adjustment signal is detected for a predetermined period of time.

In accordance with the schematic sequence diagram illustrated here, the movement modes N1 and N2 can be designed for lifting or lowering the steering wheel 2 or the steering column 3 and therefore for adjusting an inclination of the steering column 3. The method according to the disclosure can be designed in such a manner that the steering column 3 is optionally adjusted in the longitudinal direction of the steering column 3 or in respect of its inclination. In another exemplary arrangement, the method can be designed in such a manner that the steering column 3 is simultaneously adjustable in the longitudinal direction of the steering column 3 and with regard to the inclination of the steering column 3.

Figure 3:
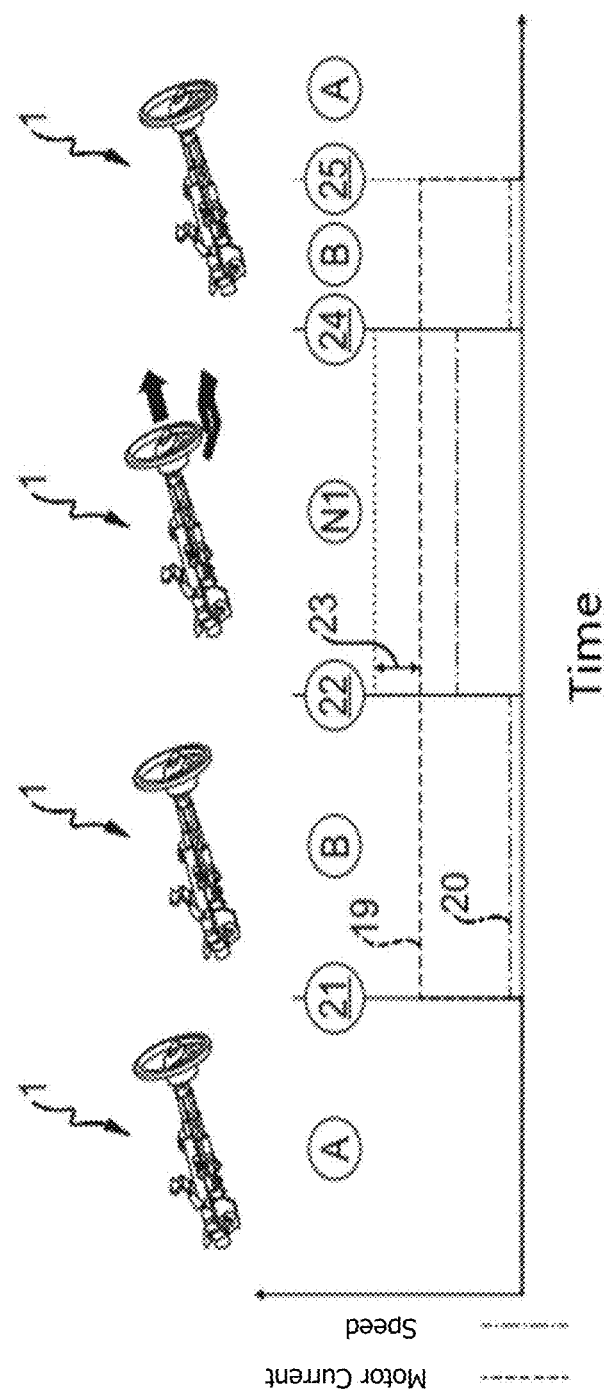
FIG. 3 shows a schematic further sequence diagram of the method according to the disclosure.

FIG. 3 shows a schematic further sequence diagram of the method. According to this merely exemplary sequence diagram, the steering apparatus 1 is illustrated in different modes in accordance with FIG. 2. Along a time axis, the change of the adjustment device 4 of the steering apparatus 1 from the starting mode A into the standby mode B and from the latter into the movement mode N1 and a return into the standby mode B and the starting mode A can be seen. For these different modes, the course or the change of an electric current for operating the electric drive 6 of the steering apparatus 1 is illustrated in accordance with the line 19. A further line 20 schematically illustrates the course and a change in a speed of the movement of the steering column 3.

In the starting mode A, the electric drive 6 is currentless. Accordingly, the steering column 3 is not adjusted and the speed is zero. On the basis of an activation signal, the adjustment device 4 transfers in accordance with transition 21 from the starting mode A into the standby mode B. In the standby mode B, a predetermined electric reference current value is applied to the electric drive 6 in this exemplary arrangement. In this exemplary arrangement, the steering column 3 is set into motion at the same time at a predetermined standby speed. In this exemplary arrangement, the steering column 3 is set into a vibratory motion both in the longitudinal direction of the longitudinal axis of the steering column 3 and in respect of a change in inclination of the steering column 3. Owing to this movement, self-locking, which is effective in the currentless state, of the electric drive 6 is released.

In this exemplary arrangement, in the standby mode B, a user pulls on the steering wheel 2 and in the longitudinal direction of the steering column 3. In this exemplary arrangement, the electric current in the electric drive 6 increases. This change in the electric current is monitored and detected, as a result of which the adjustment device 4 is transferred in accordance with transition 22 from the standby mode B into the movement mode N1. In the movement mode N1, the steering column 3 is extended in the longitudinal direction of the steering column 3 at a predetermined movement speed which is greater than the standby speed in the standby mode B. If, in accordance with double arrow 23, a difference is determined between the electric reference current value and the actual electric current of the electric drive 6, the adjustment device 4 remains in the movement mode N1. As soon as the deviation or difference in accordance with double arrow 23 from the electric reference current value assumes the value zero, the adjustment device 4 merges again in accordance with transition 24 into the standby mode B. In the process, the speed drops again to the lower standby speed. If, for a predetermined period of time, no adjustment force or no adjustment signal is detected, the adjustment device 4 merges in accordance with transition 25 from the standby mode B into the starting mode A.

The retraction of the steering column 3 or an adjustment of the inclination of the steering column 3 is undertaken in accordance with the previous explanations regarding the extension of the steering column 3.

The invention claimed is:

1. A method for adjusting a steering apparatus for a vehicle, in which a steering column is adjusted in the longitudinal direction of the steering column and/or in respect of an inclination of the steering column by an electromechanical adjustment device, and in which the adjustment device is controlled by a control device, wherein an adjustment force for adjusting the steering column is introduced into the steering apparatus via a steering wheel, wherein an adjustment signal dependent on the adjustment force is detected and/or generated, the adjustment signal being transmitted to the control device and the electromechanical adjustment device being actuated by the control device in response to the adjustment signal so the steering column is adjusted on the basis of the adjustment signal and the adjustment force applied to the steering wheel.

2. The method as claimed in claim 1, wherein the adjustment force and/or the adjustment signal are/is detected and/or generated by a sensor system, the sensor system being used to detect the adjustment force which acts on the steering column and/or in the adjustment device and/or on the steering wheel.

3. The method as claimed in claim 1, wherein the adjustment signal is detected and/or generated via a detection and/or measurement of at least one status value of the adjustment device, wherein the status value of the electric drive is detected and/or evaluated by an evaluation device, the status value comprising at least one of an electric current, an electric voltage, a torque, a driving position, an acceleration or an angular speed.

4. The method as claimed in claim 1, wherein the adjustment device is blocked and/or secured in a starting mode to prevent adjustment of the steering column, wherein the adjustment device is transferred from the starting mode into a standby mode by an activation signal, the activation signal being triggered by a user and/or depending on the status of a vehicle having the steering apparatus.

5. The method as claimed in claim 1, wherein, in a standby mode, an introduction of the adjustment force and/or generation of the adjustment signal is monitored continuously, wherein the adjustment device is transferred from the standby mode into a movement mode when an adjustment force is detected and/or an adjustment signal is detected, the steering column being moved in the movement mode in accordance with the adjustment signal.

6. The method as claimed in claim 1, wherein, in a standby mode, at least one status value in at least one electric drive of the adjustment device is monitored in respect of a change, wherein the adjustment device is transferred from the standby mode into a movement mode if the detected status value deviates from a predetermined electric reference status value, the steering column being moved in accordance with the adjustment signal.

7. The method as claimed in claim 6, wherein a sign of the change in the status value is positive or negative with regard to a predetermined reference status value the steering column being moved in the movement mode and depending on the sign in one of two opposite directions in the longitudinal direction of the steering column and/or in respect of the inclination of the steering column.

8. The method as claimed in claim 1, wherein, in a standby mode, at least one electric drive of the adjustment device is operated with a predetermined reference status value or in a predetermined reference status range, as a result of which the steering column is moved in the longitudinal direction of the steering column and/or in respect of the inclination of the steering column, in particular self-locking of the adjustment device is thereby released, wherein the steering column is set into a vibratory motion in the standby mode.

9. The method as claimed in claim 1, wherein the adjustment device changes from a movement mode into a standby mode if a previously detected adjustment force and/or a previously detected deviation of a status value of an electric drive with regard to a reference status value assumes the value zero, wherein the adjustment device is transferred from the standby mode into a starting mode if, for a predetermined period of time, no adjustment force, no adjustment signal and/or no deviation of the status value with regard to the reference status value is detected.

10. A steering apparatus for a vehicle, said steering apparatus comprising a steering column, a steering wheel connected to the steering column, and an electromechanical adjustment device, the steering column being adjustable in the longitudinal direction of the steering column and/or in respect of an inclination of the steering column by the adjustment device, and further comprising a control device for controlling the adjustment device, and a detection device designed for detecting an adjustment force introduced via the steering wheel, wherein the steering column is adjustable by an adjustment signal transmitted from the detection device to the control device, the adjustment signal being dependent on the adjustment force introduced via the steering wheel, the electromechanical adjustment device being actuated by the control device in response to the adjustment signal so the steering column is adjusted on the basis of the adjustment signal and the adjustment force applied to the steering wheel.

11. The steering apparatus as claimed in claim 10, wherein the detection device has a sensor system for detecting the adjustment force the sensor system disposed on the steering column and/or the adjustment device and/or the steering wheel.

12. The steering apparatus as claimed in claim 10, wherein the adjustment device and an evaluation device are designed as parts of the detection device, the adjustment device having at least one electric drive and a status value of the electric drive being able to be detected and being able to be evaluated by the evaluation device.

13. A steering apparatus for a vehicle, said steering apparatus comprising:
a steering column,
a steering wheel connected to the steering column, and
an electromechanical adjustment device, the steering column being adjustable in the longitudinal direction of the steering column via the electromechanical adjustment device, the electromechanical adjustment device being controllable by a control device, wherein a detection device is configured to detect an adjustment force introduced via the steering wheel, wherein the steering column is adjustable based on an adjustment signal transmitted from the detection device to the control device, the adjustment signal being dependent on the adjustment force introduced via the steering wheel, the electromechanical adjustment device being actuated by the control device in response to the adjustment signal so the steering column is adjusted on the basis of the adjustment signal and the adjustment force applied to the steering wheel.

14. The steering apparatus as claimed in claim 13, wherein the detection device includes a sensor system for detecting the adjustment force.

15. The steering apparatus as claimed in claim 14, wherein the sensor system is disposed on at least one of the steering column, the adjustment device, or the steering wheel.

16. The steering apparatus as claimed in claim 14, further comprising an evaluation device, the adjustment device having at least one electric drive and a status value of the electric drive being able to be detected and being able to be evaluated by the evaluation device.

17. The method as claimed in claim 1, wherein the electromechanical adjustment device moves the steering column in the longitudinal direction of the steering column and/or in respect of the inclination of the steering column in response to the adjustment force being applied to the steering wheel.

18. The method as claimed in claim 1, wherein the electromechanical adjustment device moves the steering column in a direction that the adjustment force is applied to the steering wheel.

19. The method as claimed in claim 10, wherein the electromechanical adjustment device moves the steering column in a direction that the adjustment force is applied to the steering wheel.

20. The method as claimed in claim 13, wherein the electromechanical adjustment device moves the steering column in a direction that the adjustment force is applied to the steering wheel.

\* \* \* \* \*